(12) United States Patent
Qingyuan

(10) Patent No.: US 9,664,983 B2
(45) Date of Patent: May 30, 2017

(54) CAMERA AND HOT SHOE CONNECTOR FOR CAMERA FUNCTIONAL ACCESSORIES

(71) Applicant: Chen Qingyuan, Yueqing (CN)

(72) Inventor: Chen Qingyuan, Yueqing (CN)

( * ) Notice: Subject to any disclaimer, the term of this patent is extended or adjusted under 35 U.S.C. 154(b) by 0 days.

(21) Appl. No.: 14/752,994

(22) Filed: Jun. 28, 2015

(65) Prior Publication Data

US 2016/0124291 A1   May 5, 2016

(30) Foreign Application Priority Data

Nov. 3, 2014   (CN) .................... 2014 2 0650180 U
Nov. 3, 2014   (CN) .................... 2014 2 0650183 U
Nov. 3, 2014   (CN) .................... 2014 2 0650348 U

(51) Int. Cl.
*G03B 17/56* (2006.01)
*G03B 17/02* (2006.01)

(52) U.S. Cl.
CPC ........... *G03B 17/566* (2013.01); *G03B 17/02* (2013.01)

(58) Field of Classification Search
CPC .............................. G03B 15/05; G03B 15/056
USPC .......................... 396/439, 176, 155; 362/9, 8
See application file for complete search history.

(56) References Cited

U.S. PATENT DOCUMENTS

2008/0298793 A1*  12/2008  Clark .................. H04N 5/2256
                                                           396/57
2015/0153631 A1*  6/2015  Chen ...................... G03B 15/05
                                                           362/9

FOREIGN PATENT DOCUMENTS

CN      201466439 U        5/2010
JP      2009180878 A  *   8/2009

OTHER PUBLICATIONS

Translation of JP 2009180878 A.*

* cited by examiner

*Primary Examiner* — Rochelle-Ann J Blackman
(74) *Attorney, Agent, or Firm* — Dave Alan Lingbeck

(57) ABSTRACT

The present invention discloses a hot shoe connector for camera functional accessories. On the camera functional accessory body exposed in the middle part of the hot shoe connector, there is fixedly provided with a set of at least two groups of electrical contacts which may match with at least two types of camera hot shoes respectively. In the electrical contact set, there is provided with a multi-functional electrical contact, with its first part corresponding to contact of camera shot shoe of a first type and its second part corresponding to contact of camera hot shoe of a second type which transmits the same type of data. The electrical contact set is connected to an auto detection control unit. The multi-functional contact also includes a second shared trigger with its first part corresponding to a first clock contact of camera hot shoe of the first type and its second part corresponding to a second clock contact of camera hot shoe of the second type. With modification to the structure, the present invention may avoid short circuit caused by wear to electrical contacts of hot shoe connector.

4 Claims, 7 Drawing Sheets

CAMERA AND HOT SHOE CONNECTOR FOR CAMERA FUNCTIONAL ACCESSORIES

TECHNICAL FIELD

The present invention relates to the field of photography and videography, and in particular to a hot shoe connector for camera functional accessories and a camera using camera functional accessories.

BACKGROUND ART

Camera functional accessories are commonly used in enhancing function of a camera and expanding its application scope. Common functional accessories such as flashlight, adaptor and remote control are attached to a camera via hot shoe. Hot shoe is a fixed slot on various digital imaging apparatus for attaching various external accessories. Generally, there is, on a camera, a hot shoe in the shape of a dovetail slot. At the lower end of a camera adaptor, there is a hot shoe connector inserted into the dovetail slot-shape hot shoe. Contacts on the hot shoe may match with electrical contacts on the hot shoe connector. Since hot shoe varies on cameras of different types, an accessory cannot be universally applied to different cameras. For example, a Nikon camera can only use a flashlight which may match with Nikon cameras, and a Canon camera can only use a flashlight which can match with Canon cameras. The fact that such accessory cannot be applied to different cameras increases the cost for users to buy.

For the above problem, there is provided in prior art some all-purpose accessories such as flashlight and remote control which may be compatible with various cameras. Since hot shoes of most cameras contain a shared contact, flashlights and remote controls of different types may be connected via the shared contact to perform flashing or remote controlling. However, as other contacts are not connected, other Through-the-Lens (TTL) parameters cannot be transmitted, and thus TTL or further functions of flashlight cannot be performed.

Referring to FIG. 4 which is a design in a second prior art, electrical contact set 43 of a functional accessory such as flashlight, adaptor and remote control is optimized to be adaptive to both Canon and Nikon hot shoes, with which one accessory may be applied to two types of cameras. Besides, TTL function is also realized as multiple contacts are connected. The electrical contact set 43 of this type of flashlight uses 8 contacts, including a shared trigger 431, a first clock foot 432, a second clock foot 433, a camera data input foot 434, a flashlight signal detection foot 435, an input and output data foot 436, a flashlight data output foot 437 and a chip select signal foot 438; wherein, the 6 symmetric contacts are the first clock foot 432, the second clock foot 433, the camera data input foot 434, the flashlight signal detection foot 435, the input and output data foot 436, and the flashlight data output foot 437. The above 6 electrical contacts are very close to each other, and they may be easily worn out after frequent plug-in and plug-out, which may finally cause short circuit and destroy the device.

In prior art, other technical solutions are also tested. For example, patent publication CN201466439U discloses a multipurpose flashlight hot shoe socket. With the 8 contacts having a certain arrangement, the socket may always have contact that may connect cameras of different brands, and thus electrical connection with multiple systems of cameras of different brands is realized. Such technical solution also has the defects as described above, that is, electrical contacts in the electrical contact set are arranged very close to each other so as to simply realize electrical connection with different cameras. In this case, electrical contacts will be seriously worn out after frequent plug-in and plug-out, shot circuit may easily occur and the device may be damaged.

Therefore, short circuit caused by wear to electrical contacts of functional accessories is an issue that should be solved by technical person in the art urgently.

BRIEF SUMMARY OF THE INVENTION

For problems existing in prior art, there is provided in the present invention a hot shoe connector for camera functional accessories, through which short circuit caused by wear to electrical contacts may be avoided. Based on the above, the present invention also provides a camera having the above camera functional accessories.

In order to achieve the above purpose, the present invention provides the following technical solution:

a hot shoe connector for camera functional accessories, fixedly mounted on a camera functional accessory body, and the camera functional accessory body being exposed in the middle part of the hot shoe connector; an electrical contact set of at least two groups of electrical contact which may match with at least two types of camera hot shoes respectively, being fixedly mounted on the camera functional accessory body exposed in the middle part of the hot shoe connector; a multi-functional electrical contact being provided within the electrical contact set of at least two groups of electrical contacts; a first part of the multi-functional electrical contact corresponding to contact of camera hot shoe of a first type and a second part of the multi-functional electrical contact corresponding to contact of camera hot shoe of a second type which transmits the same type of data as the contact of camera hot shoe of the first type; the electrical contact set being connected to an auto detection control unit; the multi-functional contact including a second shared trigger whose first part corresponding to a first clock contact of camera hot shoe of the first type and second part corresponding to a second clock contact of camera hot shoe of the second type.

Preferably, there are two types of camera hot shoes that may match with the electrical contact set and the electrical contact set has two groups of electrical contacts.

Furthermore, the multi-functional electrical contact also includes a third shared trigger. A first part of the third shared trigger corresponds to a flashlight data output contact of camera hot shoe of the first type and a second part of the third shared trigger corresponds to an input and output data contact of camera hot shoe of the second type.

Furthermore, the top face of electrical contacts in the electrical contact set is a flat face.

For the hot shoe connector of the present invention, its structure may be adaptive to various functional accessories widely used in cameras, including but not limited to flashlight, adaptor and remote control.

When the camera functional accessory is a flashlight, it includes a flashlight body, a flashlight tube provided within the flashlight body, a hot shoe connector fixedly mounted on the flashlight body and the flashlight body being exposed in the middle part of the hot shoe connector.

Furthermore, there is provided within the flashlight a signal receiver connected to the auto detection control unit for receiving signals.

When the camera functional accessory is a camera adaptor, it includes an adaptor body, an adaptor hot shoe mounted on the adaptor body, a hot shoe connector fixedly mounted on the adaptor body and the adaptor body being exposed in the middle part of the hot shoe connector.

Preferably, the adaptor hot shoe is mounted on the top of the adaptor body.

When the camera functional accessory is a camera remote control, it includes a remote control body, a wireless signal transmission module provided within the remote control body, a hot shoe connector fixedly mounted on the remote control body, and the remote control body being exposed in the middle part of the hot shoe connector.

Wherein, there is provided, at the top of the remote control body, an adaptor hot shoe for connecting camera accessories.

Wherein, the wireless signal transmission module includes a signal receiver being connected to the auto detection control unit for receiving signals and a signal transmitter being connected to the auto detection control unit for transmitting signals.

Based on the above, the present invention also provides a camera including a camera body, a hot shoe mounted on the camera body and a camera functional accessory connected to the hot shoe. The camera functional accessory is as described above.

The hot shoe connector of the present invention is mounted on a camera functional accessory for connecting hot shoe of a camera. On the hot shoe connector of the present invention, there is provided with an electrical contact set of at least two groups of electrical contacts, with which a camera adaptor may be applied to the types of cameras corresponding to both of the at least two groups of electrical contacts. In the electrical contacts, the adjacent electrical contacts which transmit the same type of data signal but belong to different groups are integrated into a multi-functional electrical contact which has a larger area and occupies the position shared by the several electrical contacts before they are integrated. When the hot shoe connector is inserted into hot shoe of a camera, the multi-functional electrical contact may be, at first, against but not connected to contacts of the camera hot shoe, different electrical contacts in different groups are connected, and the auto detection control unit within the adaptor body determines, based on the connected different electrical contacts, the group to which the multi-functional electrical contact is connected so as to determine the type of the camera connected, call the corresponding program and determine the contact of hot shoe to which the multi-functional electrical contact is connected and perform the connection. With the above design, short circuit caused by wear to electrical contacts of functional accessories is avoided.

DESCRIPTION OF DRAWINGS

In order to better illustrate embodiments of the present invention or technical solutions in prior art, accompanying figures needed to illustrate embodiments or prior art are briefly described hereafter. Obviously, the figures described hereafter are only some of the embodiments of the present invention. For an ordinary technical person in the art, other figures may also be obtained based on these figures without any creative effort.

FIG. 1-1, FIG. 1-2 and FIG. 1-3 are schematic diagrams of inner connection structures of camera functional accessories provided in the present invention; wherein, FIG. 1-1 is a flashlight, FIG. 1-2 is an adaptor and FIG. 1-3 is a remote control;

FIG. 2 is a schematic diagram of the hot shoe of a Nikon camera;

FIG. 3 is a schematic diagram of the hot shoe of a Canon camera;

Wherein, 11 is multi-contact camera connection interface, 12 is auto detection control unit, 13 is 2.4 G transmitter, 14 is 2.4 G receiver, 2 is hot shoe of a Nikon camera, 3 is hot shoe of a Canon camera, 4 is functional accessory, 41 is functional accessory body, 42 is hot shoe connector, 43 is electrical contact set, 431 is shared trigger, 432 is first clock foot, 433 is second clock foot, 434 is camera data input foot, 435 is flashlight signal detection foot, 436 is input and output data foot, 437 is flashlight data output foot, 438 is chip select signal foot, 5 is functional accessory, 51 is functional accessory body, 52 is hot shoe connector, 53 is electrical contact set, 531 is first shared trigger, 532 is second shared trigger, 533 is camera data input foot, 534 is flashlight signal detection foot, 535 is third shared trigger, 536 is chip select signal foot, and 54 is adaptor hot shoe.

DETAIL DESCRIPTION OF THE INVENTION

Embodiments

Hereinafter, technical solutions in the embodiments are fully illustrated, taken in conjunction with the drawings. Apparently, the illustrated embodiments are only a part of the invention rather than all of it. Based on embodiments of the present invention, any other embodiments an ordinary technical person in the art obtains without any creative effort shall belong to the protection scope of the present invention.

Figure 1:
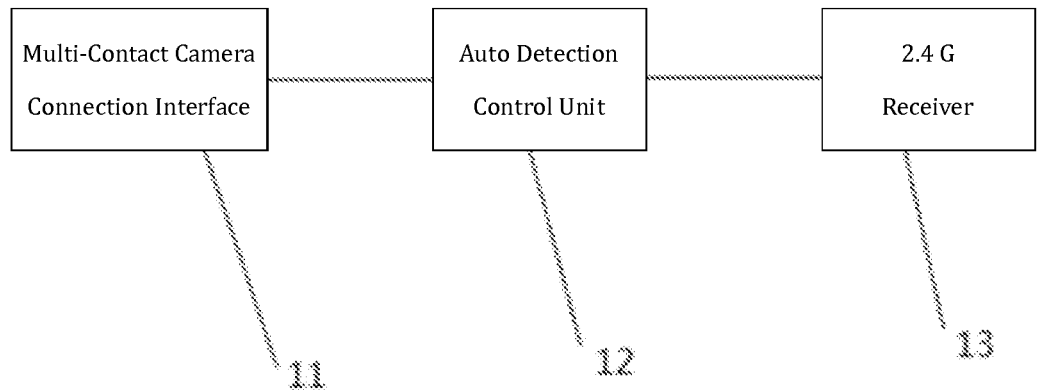
Figures 1, 2:
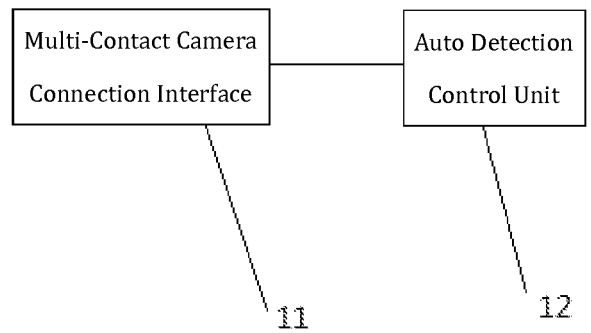
Figures 1, 2, 3:
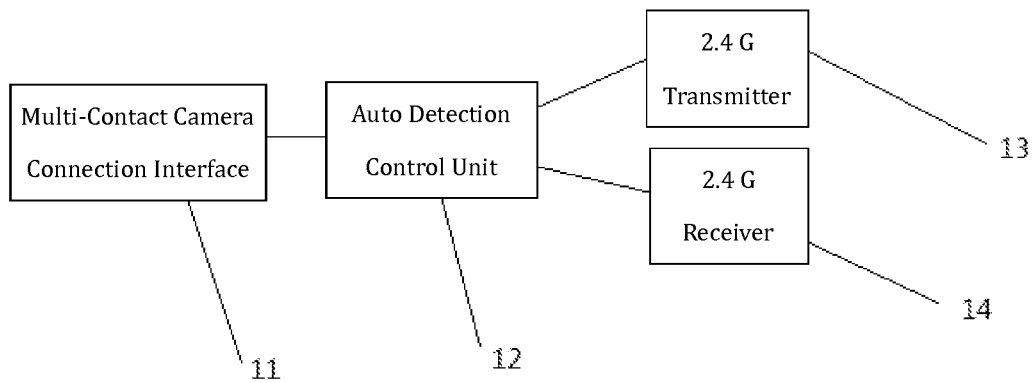
Figure 2:
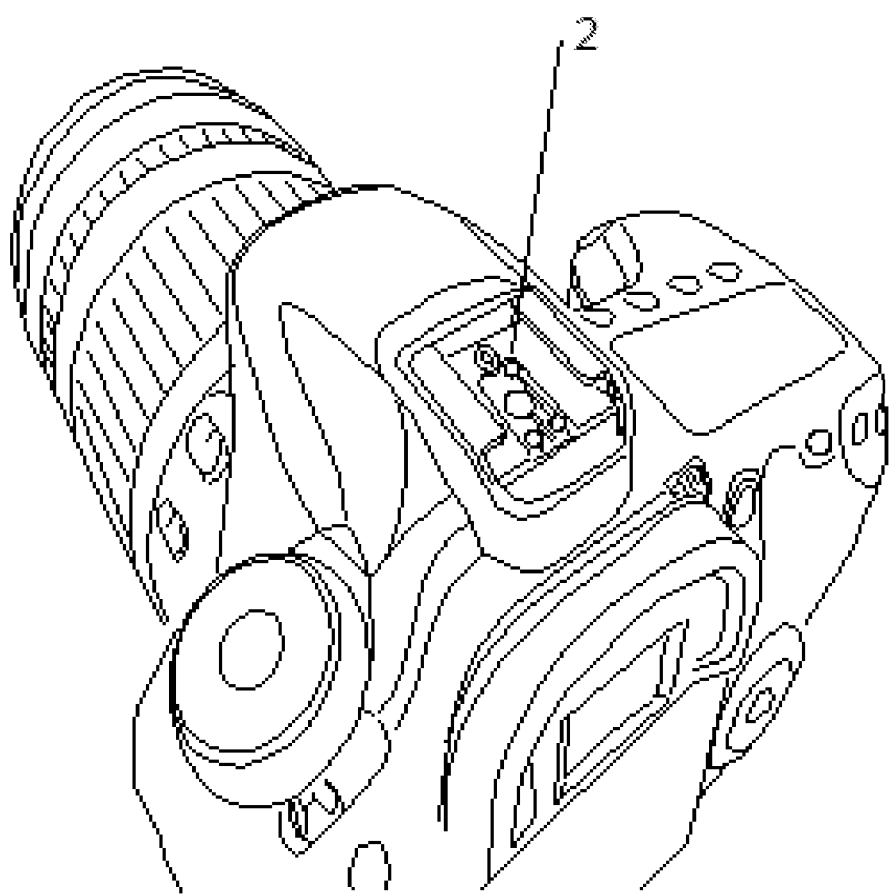
Figure 3:
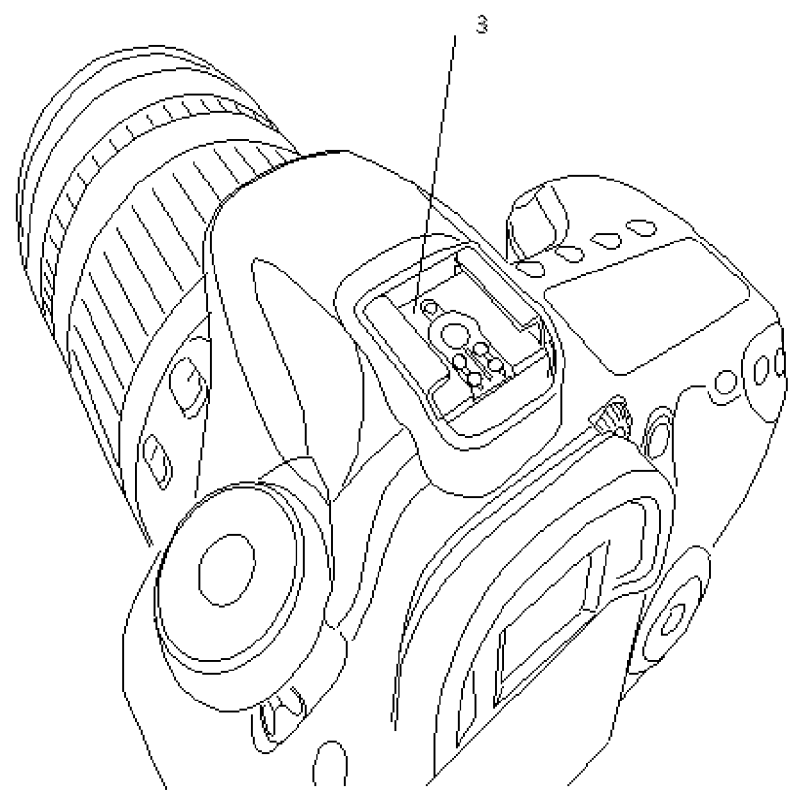
Figure 4:
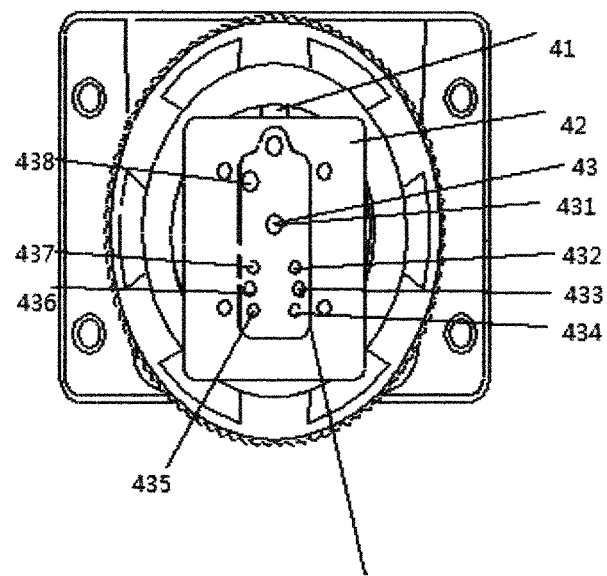
FIG. 4 is a bottom view of a camera functional accessory of a second prior art.
Figure 5A:
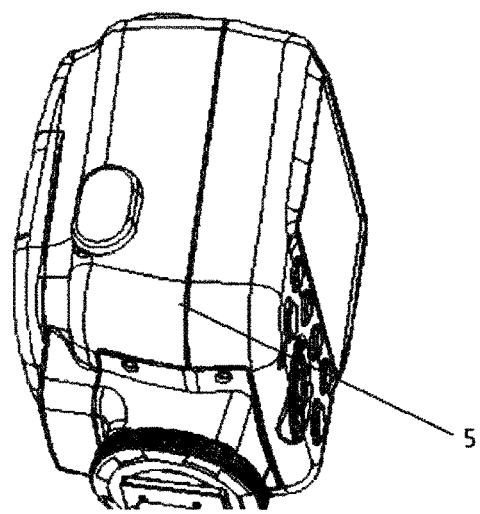
FIG. 5a, FIG. 5b, FIG. 5c are schematic diagrams of a flashlight, adaptor and remote control using the technical solution of the present invention.
Figure 5B:
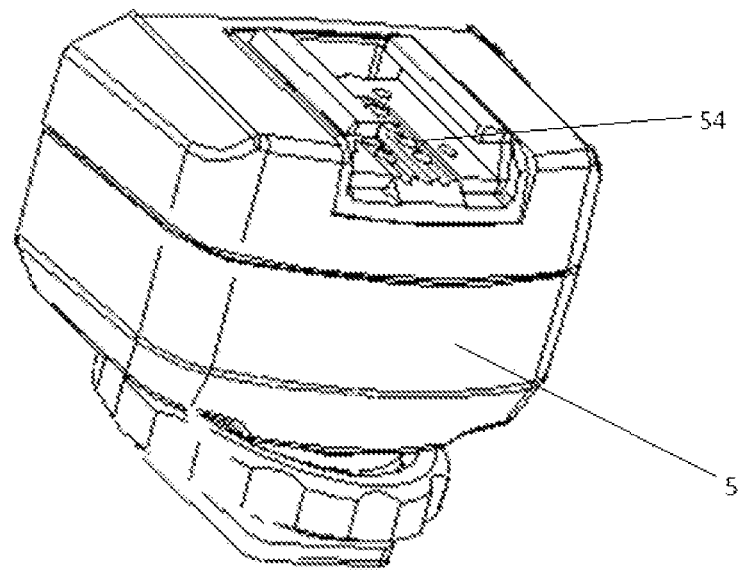
Figure 5C:
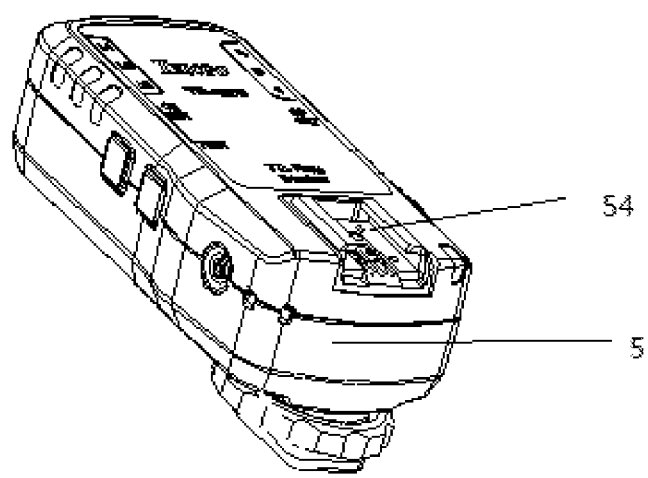
Figure 6:
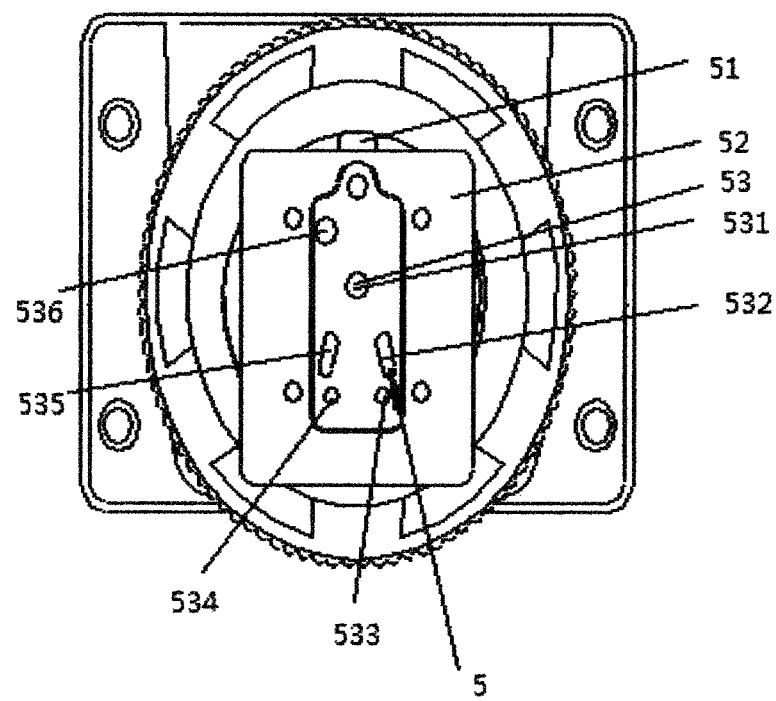
FIG. 6 is a bottom view of a functional accessory using the technical solution of the present invention.
Figure 7:
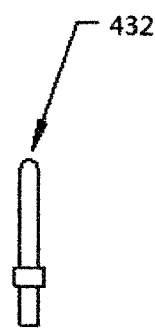
FIG. 7 is a side view of an electrical contact of a camera remote control in prior art.
Figure 8:
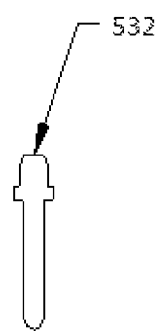
FIG. 8 is a side view of an electrical contact of a camera remote control provided in the present invention.

Referring to FIG. 6, hot shoe connector 52 of the present invention is fixedly mounted on camera functional accessory 5 (such as flashlight, camera adaptor, remote control), and camera functional accessory body 51 (such as flashlight body, adaptor body, remote control body) is exposed in the middle part of the hot shoe connector 52; on the camera functional accessory exposed in the middle part of the hot shoe connector, there is fixedly provided with an electrical contact set 53 of at least two groups of electrical contacts which may match with at least two types of camera hot shoes respectively; in the electrical contact set of at least two groups of electrical contacts, there is provide with a multi-functional electrical contact, a first part of which corresponds to contact of camera hot shoe of a first type, and a second part of which corresponds to contact of camera hoe shoe of a second type which transmits the same type of data as contact of camera hot shoe of the first type. The electrical contact set is connected to auto detection control unit 12.

With the electrical contact set 53, a functional accessory may be applied to cameras corresponding to the at least two groups of electrical contacts in the electrical contact set 53. In the electrical contacts, the adjacent electrical contacts which transmit the same type of data signal but belong to different groups are integrated into a multi-functional electrical contact which has a larger area and occupies the position shared by the several electrical contacts before they are integrated. When the hot shoe connector 52 is inserted into a camera hot shot, the multi-functional electrical contact may be at first against but not connected to contact of the camera hot shoe. Meanwhile, different electrical contacts in different groups are connected, the auto detection control unit 12 within the functional accessory determines, based on the connected different electrical contacts, the group to which the multi-functional electrical contact is connected so as to determine the type of the camera, and determines the contact of hot shoe to which the multi-functional electrical contact is connected and perform the connection.

Wherein, multi-functional contact includes second shared trigger 532, a first part of the second shared trigger 532 corresponds to a first clock contact of camera hot shoe of a first type, and a second part of the second shared trigger 532 corresponds to a second clock contact of camera hot shoe of a second type. The electrical contact set 53 of two groups of electrical contacts includes first shared trigger 531, chip select signal foot 536, flashlight signal detection foot 534, camera data input foot 533, flashlight data output foot, input and output data foot, second shared trigger 532 which is formed by the integration of a first clock foot 432 and a second clock foot 433 and occupies the position of the two clock feet.

Wherein, the first shared trigger 531 is mounted in the middle of the flashlight body 51 exposed in the middle part of the hot shoe connector 52, the chip select signal foot 536 is mounted at the upper left side of the first shared trigger 531, the flashlight data output foot is mounted at the lower left side of the first shared trigger 531, the input and output data foot is mounted at the lower left side adjacent to the flashlight data output foot, the second shared trigger 532 is mounted at the lower right side of the first shared trigger 531 and symmetric to the position shared by the input and output data foot and the flashlight data output foot, the flashlight signal detection foot 534 is mounted at the lower right side of the input and output data foot and right below the flashlight data output foot, the camera data input foot 533 is mounted at the lower right side of the first shared trigger 531 and symmetric to the flashlight signal detection foot 534.

In one embodiment of the present invention, there are two types of camera hot shoes that may match with the electrical contact set 53, and the electrical contact set 53 has two groups of electrical contacts. Generally, camera hot shoes that may match with the electrical contact set 53 are Canon camera hot shoe and Nikon camera hot shoe respectively. The electrical contact set 53 may have multiple groups, which permits its application on even more types of cameras. However, too many groups may also cause too many electric contacts contained in the electrical contact set 53 and it is difficult to arrange those electrical contacts. Generally, Nikon and Canon cameras are the two most common cameras in the market, and the arrangement of contacts on hot shoes of the two types of cameras is different. While, the electrical contact set 53 of two groups of electrical contacts used in the present invention may correspond to the two types of cameras and thus may be used on the two types of cameras.

In the present invention, the electrical contact set 53 is provided with two groups of electrical contacts, wherein, the electrical contacts corresponding to hot shoe 3 of a Canon camera are flashlight signal detection foot 534, camera data input foot 533 and flashlight data output foot while the electrical contacts corresponding to hot shoe 2 of a Nikon camera are chip select signal foot 536 and input and output data foot. The first shared trigger 531 corresponds to contacts of the both two types of camera hot shoes. The second shared trigger 532 is formed by the integration of the first clock foot 432 and the second clock foot 433 which are adjacent to each other, both used to transmit time signal and belong to different groups and thus may be integrated. When connected to a hot shoe, the second shared trigger 532 may be adaptive to hot shoes of both Canon and Nikon cameras. Via the auto detection control unit 12, it may be determined whether the second shared trigger foot 532 chooses to use the second clock foot 433 corresponding to a Nikon camera or the first clock foot 432 corresponding to a Canon camera. During the determination process, the difference is that the chip select signal foot 536 is selected for a Nikon camera while the flashlight signal detection foot 534 or camera data input foot 533 is be selected for a Canon camera. For example, after being connected to a camera, if the auto detection control unit 12 detects a connection to the chip select signal foot 536, it means that the connected camera is a Nikon camera and thus the second shared trigger 532 selects to connect the circuit corresponding to the second clock foot 433. Via the same method, the type of camera may also be determined based on whether the different contact is connected or not, and thus short circuit caused by wear to electrical contacts of flashlight is avoided. Besides, since multiple contacts of the camera and the flashlight are connected, more signals, not just signals of camera flashlight, may be transmitted and thus flashlight TTL is realized.

All electrical contacts and the circuits they connect behind form the multi-contact camera connection interface 11, the auto detection control unit 12 performs the function of automatically detecting the type of camera connected. Via connection to the multi-contact camera connection interface 11, the auto detection control unit 12 analyzes the type of signal connected, determines type of camera connected, and correspondingly adjusts the type of circuit connected by the second shared trigger 532, so as to form a correct connection.

In another embodiment of present invention, the multi-functional electrical contact also includes a third shared trigger 535, a first part of which corresponds to flashlight data output contact of camera hot shoe of the first type and the second part of which corresponds to input and output data contact of camera hot shoe of the second type. The flashlight data output foot and input and output data foot are integrated into the third shared trigger 535 which occupies the position previously shared by the two feet. Similar to the above principle, the flashlight data output foot and the input and output data foot are adjacent, transmit the same type of signals but belong to different groups, and thus may be integrated. After integration, short circuit caused by wear to electrical contacts of flashlight may be further avoided.

In yet another embodiment of the present invention, the top face of electrical contacts in the electrical contact set 53 is a flat face. The reason for designing the top of the electrical contacts into a flat top instead of a pointed end is to better protect the electrical contacts and reduce wear in use.

The structure disclosed in the present invention may be applied to various functional accessories.

When the functional accessory 5 is a flashlight, the flashlight includes:
  a functional accessory body 51, configured as a flashlight body;
  a flashlight tube, provided within the flashlight body;
  a hot shoe connector 52, fixedly mounted on the flashlight body, the flashlight body being exposed in the middle part of the hot shoe connector 52;
  an electrical contact set 53 of at least two groups of electrical contacts which match with at least two types of camera hot shoes respectively, fixedly mounted on the flashlight body 51 exposed in the middle part of the hot shoe connector 52;

a multi-functional electrical contact, provided in the electrical contact set 53 of at least two groups of electrical contacts; wherein a first part of the multi-functional electrical contact corresponds to contact of a camera hot shoe of a first type and a second part of the multi-functional electrical contact corresponds to contact of a camera hot shoe of a second type which transmits the same type of data as the contact of the camera hot shoe of the first type; the electrical contact set 53 is connected to the auto detection control unit 12.

A wireless signal transmission module, provided within the flashlight body is used to control other camera accessories, and the hot shoe connector 52 is used to connect hot shoe of a camera. There is mounted, on the hot shoe connector 52, an electrical contact set 53 of at least two groups of electrical contacts, which realize the use of a flashlight on the types of cameras corresponding to the at least two groups of electrical contacts in the electrical contact set 53. In the electrical contacts, the adjacent electrical contacts which transmit the same type of data signal but belong to different groups are integrated into a multi-functional electrical contact which has a larger area and occupies the position shared by the several electrical contacts before they are integrated. As such, when the hot shoe connector 52 is inserted into hot shoe of a camera, the multi-functional electrical contact may be at first against but not connected to contact of the camera hot shoe, different electrical contacts of different groups are connected, and the auto detection control unit 12 within the flashlight body determines, based on the connected different electrical contacts, the group to which the multi-functional electrical contact is connected so as to determine the type of camera connected and the contact of hot shoe to which the multi-functional electrical contact is connected and performs the connection. With the above design, short circuit caused by wear to electrical contacts of flashlight is avoided.

When the functional accessory 5 is a camera adaptor, the camera adaptor includes:

a functional accessory body 51, configured as an adaptor body;

an adaptor hot shoe 54, mounted on the adaptor body;

a hot shoe connector 52, fixedly mounted on the adaptor body, the adaptor body being exposed in the middle part of the hot shoe connector 52;

an electrical contact set 53 of at least two groups of electrical contacts which may match with at least two types of camera hot shoes respectively, fixedly mounted on the adaptor body exposed in the middle part of the hot shoe connector 52;

a multi-functional electrical contact, being provided in the electrical contact set 53 of at least two groups of electrical contacts, a first part of which corresponds to contact of a camera hot shoe of a first type, a second part of which corresponds to contact of a camera hot shoe of a second type which transmits the same type of data as the contact of the camera hot shoe of the first type, and the electrical contact set 53 being connected to the auto detection control unit 12.

The adaptor hot shoe 54, mounted on the adaptor body, is used to connect camera accessories, and the hot shoe connector 52 is used to connect hot shoe of a camera. There is mounted, on the hot shoe connector 52, an electrical contact set 53 of at least two groups of electrical contacts, which realize the use of a camera adaptor on the types of cameras corresponding to the at least two groups of electrical contacts in the electrical contact set 53. In the electrical contacts, the adjacent electrical contacts which transmit the same type of data signal but belong to different groups are integrated into a multi-functional electrical contact which has a larger area and occupies the position shared by the several electrical contacts before they are integrated. As such, when the hot shoe connector 52 is inserted into hot shoe of a camera, the multi-functional electrical contact may be at first against but not connected to contact of the camera hot shoe, different electrical contacts of different groups are connected, and the auto detection control unit 12 within the adaptor body determines, based on the connected different electrical contacts, the group to which the multi-functional electrical contact is connected so as to determine the type of camera connected and the contact of hot shoe to which the multi-functional electrical contact is connected and performs the connection. With the above design, short circuit caused by wear to electrical contacts of camera adaptor is avoided.

When the functional accessory 5 is a camera remote control, the remote control includes:

a functional accessory body 51, configured as a remote control body;

a wireless signal transmission module, provided within the remote control body;

a hot shoe connector 52, fixedly mounted on the remote control body, the remote control body being exposed in the middle part of the hot shoe connector 52;

an electrical contact set 53 of at least two groups of electrical contacts which may match with at least two types of camera hot shoes respectively, fixedly mounted on the remote control body exposed in the middle part of the hot shoe connector 52;

a multi-functional electrical contact, being provided in the electrical contact set 53 of at least two groups of electrical contacts, a first part of which corresponds to contact of a camera hot shoe of a first type, a second part of which corresponds to contact of a camera hot shoe of a second type which transmits the same type of data as the contact of the camera hot shoe of the first type, and the electrical contact set 53 being connected to the auto detection control unit 12.

The wireless signal transmission module, provided within the remote control body, is used to control other camera accessories, and the hot shoe connector 52 is used to connect hot shoe of a camera. There is mounted, on the hot shoe connector 52, an electrical contact set 53 of at least two groups of electrical contacts, which realize the use of a camera remote control on the types of cameras corresponding to the at least two groups of electrical contacts in the electrical contact set 53. In the electrical contacts, the adjacent electrical contacts which transmit the same type of data signal but belong to different groups are integrated into a multi-functional electrical contact which has a larger area and occupies the position shared by the several electrical contacts before they are integrated. As such, when the hot shoe connector 52 is inserted into hot shoe of a camera, the multi-functional electrical contact may be at first against but not connected to the contact of the camera hot shoe, different electrical contacts of different groups are connected, and the auto detection control unit 12 within the remote control body determines, based on the connected different electrical contacts, the group to which the multi-functional electrical contact is connected so as to determine the type of camera connected and the contact of hot shoe to which the multi-functional electrical contact is connected and performs the connection. With the above design, short circuit caused by wear to electrical contacts of camera remote control is avoided.

The wireless signal transmission module used above includes a signal receiver connected to the auto detection control unit 12 for receiving signals. The signal receiver connected to the auto detection control unit 12 is a 2.4 G receiver 13. The flashlight receives signals via the 2.4 G receiver 13.

Based on various functional accessories provided in the above embodiments, there is also provided in the present invention a camera including a camera body, a hot shoe mounted on the camera body and a functional accessory connected to the hot shoe.

Each embodiment herein is illustrated in a progressive way, with the focus of each embodiment different from another. The similar parts of each embodiment may be referred to each other.

With the above description of the disclosed embodiments, a professional technical person in the art will be able to realize or utilize the present invention. Various modifications to those embodiments will be obvious to professional technical persons in the art. The general principle defined herein may be realized in other embodiments without departing from the spirit or scope of the present invention. Therefore, the present invention will not be limited to those embodiments illustrated herein, but be in accordance with the broadest scope consistent with the principle and novel characteristic disclosed herein.

I claim:

1. A hot shoe connector for camera functional accessories, characterized in that the hot shoe connector is fixedly mounted on a camera functional accessory body and the camera functional accessory body is exposed in the middle part of the hot shoe connector; on the camera functional accessory body exposed in the middle part of the hot shoe connector, there is fixedly provided with an electrical contact set of at least two groups of electrical contacts which match with at least two types of camera hot shoes respectively; in the electrical contact set of at least two groups of electrical contacts, there is provided with a multi-functional electrical contact, with its first part corresponding to contact of camera hot shoe of a first type and its second part corresponding to contact of camera hot shoe of a second type which transmits the same type of data as the contact of camera hot shoe of the first type; the electrical contact set is connected to an auto detection control unit; the multi-functional contact also includes a second shared trigger with its first part corresponding to a first clock contact of camera hot shoe of the first type and its second part corresponding to a second clock contact hot shoe of the second type, wherein the camera functional accessory is a camera remote control, including a remote control body, a wireless signal transmission module provided within the remote control body, a hot shoe connector fixedly mounted on the remote control body, and the remote control body being exposed in the middle part of the hot shoe connector.

2. The hot shoe connector of claim 1, characterized in that there is mounted on the top of the remote control body an adaptor hot shoe for connecting a camera accessory.

3. The hot shoe connector of claim 1, characterized in that the wireless signal transmission module includes a signal receiver connected to the auto detection control unit for receiving signals and a signal transmitter connected to the auto detection control unit for transmitting signals.

4. A camera, characterized in that it includes a camera body, a hot shoe mounted on the camera body and a camera functional accessory connected to the hot shoe, and the camera functional accessory is as defined according to claim 1.

* * * * *